United States Patent [19]
Vanaki

[11] Patent Number: 5,793,492
[45] Date of Patent: Aug. 11, 1998

[54] WHEEL PROFILE SENSOR

[75] Inventor: Hassan Vanaki, Little Canada, Minn.

[73] Assignee: Loram Maintenance of Way, Inc., Hamel, Minn.

[21] Appl. No.: 788,019

[22] Filed: Jan. 24, 1997

[51] Int. Cl.⁶ .................................................. G01B 11/08
[52] U.S. Cl. ................................. 356/376; 356/385
[58] Field of Search .............................. 356/376, 384, 356/386

[56] References Cited

U.S. PATENT DOCUMENTS

| | | |
|---|---|---|
| 3,897,156 | 7/1975 | Chasson . |
| 3,970,847 | 7/1976 | Wood . |
| 4,040,738 | 8/1977 | Wagner . |
| 4,125,317 | 11/1978 | Gordon et al. . |
| 4,155,526 | 5/1979 | Noble . |
| 4,181,430 | 1/1980 | Shirota . |
| 4,531,837 | 7/1985 | Panetti . |
| 4,674,869 | 6/1987 | Pryor et al. . |
| 4,678,920 | 7/1987 | Iadipaolo et al. . |
| 4,679,447 | 7/1987 | Sieradzki et al. . |
| 4,749,870 | 6/1988 | Schmalfuss et al. ........... 250/559.24 |
| 4,798,963 | 1/1989 | Whittkopp et al. . |
| 4,798,964 | 1/1989 | Schmalfuss et al. . |
| 4,932,784 | 6/1990 | Danneskiold-Samsoe . |
| 5,133,521 | 7/1992 | Gutauskas . |
| 5,247,338 | 9/1993 | Danneskiold-Samsoe . |
| 5,636,026 | 6/1997 | Mian et al. ........................ 356/376 |

OTHER PUBLICATIONS

*Progressive Railroading*, Dec. 1995, IEM Advertisement, p. 12.

*Primary Examiner*—Richard A. Rosenberger
*Attorney, Agent, or Firm*—Patterson & Keough, P.A.

[57] ABSTRACT

The present invention is a method and measurement apparatus for measuring the profile of a railway wheel while the railway wheel is in rolling motion on a rail. The railway wheel has a gage side and a field side and a circumferentially defined running surface and flange. The measurement apparatus comprises a first sensor means that is disposed on the field side of the railway wheel and which is disposed at an included angle with respect to the rail that is less than orthogonal senses the profile of the running surface and flange of the railway wheel at a point on the circumference. A second sensor means is disposed on the gage side of the railway wheel and senses selected wheel parameters. A controller is operably communicatively coupled to the first and second sensor means. The controller activates the first sensor means responsive to the detection of the presence of a railway wheel and applies the selected railway wheel parameters sensed by the second sensor means to the wheel profile sensed by the first sensor means to generate an actual profile measurement of the railway wheel running surface and flange taken along a plane defined by a radial section of the railway wheel.

26 Claims, 7 Drawing Sheets

WHEEL PROFILE SENSOR

TECHNICAL FIELD

The present invention relates to an apparatus for sensing the profile of the operating surface of a railway wheel. More particularly, the present invention relates to a sensor system for sensing and recording the profile of a railway wheel while the wheel is in motion.

BACKGROUND OF THE INVENTION

There is a pressing need for railroads to cut operating costs while at the same time maintain a high level of service performance. To this end, considerable research has been done on the wheel-rail interface. This research has provided the impetus for the continual scrutiny and subsequent maintenance of the rails and road beds. The technology and machinery for rail maintenance and repairs is well known and widely practiced by all railroad companies. In contrast, however, inspection of the wheels of rolling stock is still done manually on an aperiodic basis. This is very labor intensive and time consuming and must be accomplished when the rolling stock is not moving. This type of maintenance and inspection activity needs to be done much more efficiently, with a greater degree of accuracy, and at a variety of locations, preferably while the rolling stock is in motion. The inspection activity should be automated to the greatest extent possible.

The profile of the operating surface of the railway wheel is defined by a running surface and an adjacent flange. The running surface and flange are defined by three standardized parameters, which are flange height, flange thickness, and rim thickness. Wheels are condemned and replaced based on these parameters. In practice, these three parameters are currently measured manually using an American Association of Railways (A.A.R.) steel gage. In order to maintain standardization, an automated profile sensor should detect and record the same three parameters as measured by the steel gage. Additional useful parameters that should be sensed are the wheel diameter and the overall profile shape.

U.S. Pat. Nos. 4,798,963 and 4,798,964 illuminate the circumferential tread surface of the wheel in a radial direction. This requires that the rotational axis of the wheel passing through the wheel center and the direction of illumination are both in a plane passing through the point on the tread surface, which is the measuring point. In order to measure wheels of different diameter, this requires that the light source be placed in an enclosure beneath the rail, as depicted in FIG. 1 of the '964 patent.

U.S. Pat. Nos. 4,932,784 and 5,247,338 provide for non-radial illumination of the tread surface of the wheel. A separate sensor is required to determine lateral displacement of the wheel with respect to the rail. A third sensor is required if a determination of wheel size is desired. No determination of the tread surface is made along a plane defined by a radial section of the wheel.

SUMMARY OF THE INVENTION

The wheel profile sensor of the present invention automates the wheel inspection process. The present invention provides immediate and accurate measurements of five important wheel parameters while the wheel is in motion. These parameters are: flange height, flange thickness, rim thickness, wheel diameter, and angle of attack. The angle of attack parameter is useful in correcting the sensed profile of the wheel. The present invention is capable of taking measurements from wheels on both rails while the wheels are passing the inspection platform at varying speeds.

The components of the inspection platform that perform the wheel sensing and image collection functions are mounted within environmentally controlled enclosures which are in turn mounted on relatively thick steel plates. One large plate is located on the gage side of the wheels between the two rails and two additional smaller plates are located on both of the field sides of the rails adjacent to the large plate. The enclosures on each field plate contain a laser and a camera which are used to retrieve the profile images of the running surface of each wheel of a train that passes the inspection platform. These enclosures additionally house one portion of the sensing pairs used to determine the speed of the train and the presence of a wheel at the position on the rail where the running surface profile is captured.

The enclosures mounted on the large plate between the wheels contain a plurality of emitters in the EMF spectrum, preferably lasers that project a detectable line on the gage side of the wheel. A plurality of cameras responsive to the emitters capture the images projected on the gage side of the wheel as the wheel passes the inspection platform. The camera may be a photographic camera, CCD (charge coupled device) camera or an x-ray camera. A duplicate set of emitters and cameras is utilized to capture the profile of the running surface of the second wheel on an axle.

An emitter and a camera are mounted in enclosures on each of the field side plates to illuminate and capture the image of the running surface of the wheel. The emitter and a camera are mounted at an acute included angle with respect to the center line of the rail.

A control system receives the image information from the cameras and performs corrections to the sensed profile of the wheel to account for the motion of the wheel in both the horizontal and vertical dimensions and for the varying diameters of the wheels to obtain an actual profile of the wheel.

The present invention is a method and measurement apparatus for measuring the profile of a railway wheel while the railway wheel is in rolling motion on a rail. The railway wheel has a gage side and a field side and a circumferentially defined running surface and flange. The measurement apparatus comprises a first sensor means that is disposed on the field side of the railway wheel and which is disposed at an included angle with respect to the rail that is less than orthogonal. The first sensor means senses the profile of the running surface and flange of the railway wheel at a point on the circumference. A second sensor means is disposed on the gage side of the railway wheel and senses selected wheel parameters. A control means is operably communicatively coupled to the first and second sensor means. The control means activates the first sensor means responsive to the detection of the presence of a railway wheel and applies the selected railway wheel parameters sensed by the second sensor means to the wheel profile sensed by the first sensor means to generate an actual profile measurement of the railway wheel running surface and flange taken along a plane defined by a radial section of the railway wheel.

DETAILED DESCRIPTION OF THE DRAWINGS

Figure 1:
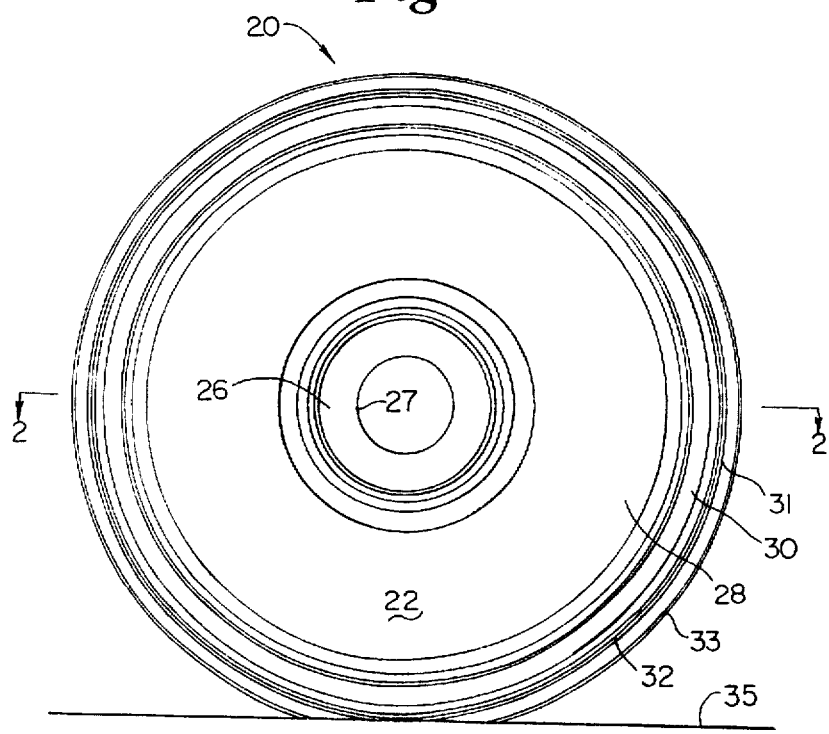
FIG. 1 is an elevational view of the field side of a railway wheel supported on a railhead.
Figure 2:
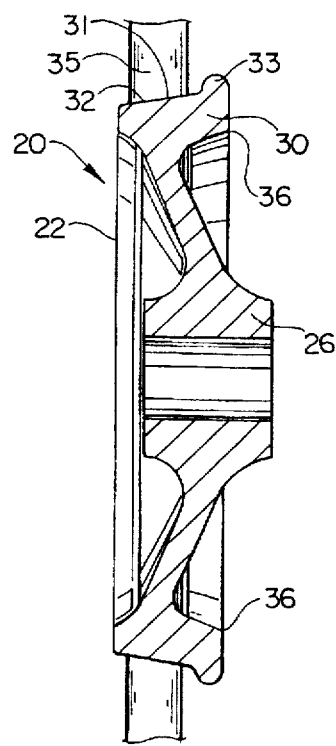
FIG. 2 is a sectional view of a railway wheel taken along line 2—2 of FIG. 1.

FIGS. 1 and 2 depict a typical railway wheel 20. Such a wheel may be utilized on a railroad car or on a railroad locomotive. The railway wheel 20 has a field side 22. The field side 22 is the side of the railway wheel 20 that faces outward when the wheel 20 is mounted on the truck of a railroad car or locomotive. The railway wheel 20 additionally has an opposed gage side 24. The gage side 24 faces inward between the two rails when the railway wheel 20 is mounted on a truck.

The railway wheel 20 has a hub 26 with axle bore 27 defined therein for mounting on an axle of the truck of the railroad vehicle. A supporting web 28 extends outward from the hub 26 to support the rim 30 of the railway wheel 20. The rim 30 has an operating surface 31, defined by a running surface 32 and a flange 33. The running surface 32 and the flange 33 are in contact with the railhead 35 as the railway wheel 20 traverses over the railhead 35. The flange 33 is always disposed on the gage side 24 of the railway wheel 20.

A gage circumference 34 is defined on the gage side 24 of the railway wheel 20. The gage circumference is best viewed in FIG. 8. A point on the gage circumference 34 is defined as a gage point 36, depicted in FIG. 2. As will be shown, the gage point 36 becomes the reference point from which to measure the standard parameters that define the profile of the running surface 32 and flange 33 of the railway wheel 20.

Figure 2A:
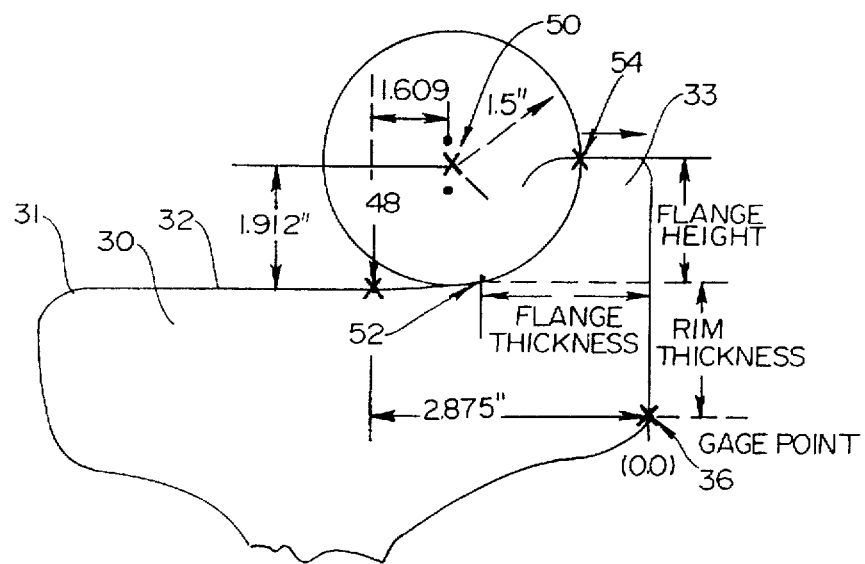
FIG. 2a is a sectional view of the rim of the railway wheel with the standardized profile defining parameters depicted thereon.
Figure 2B:
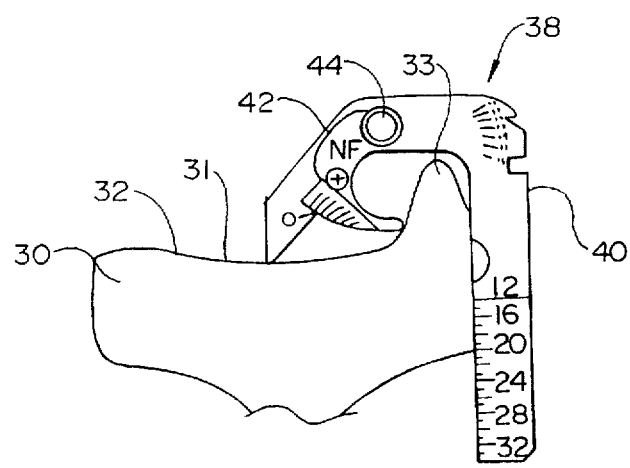
FIG. 2b is a sectional view of the rim of the railway wheel with an A.A.R. steel gage disposed alongside the gage side of the railway wheel in position to measure the standardized parameters of the profile.

These standardized parameters are presently measured using an American Association of Railroads (A.A.R.) wheel gage 38, as depicted in FIG. 2b. The A.A.R. wheel gage 38 is depicted in the proper position on the gage side 24 of the railway wheel 20 to measure the standardized parameters of the rim 30. The A.A.R. wheel gage 38 has a shank 40 positioned parallel with the gage side 24 surface of the rim 30. A portion of the shank 40 hooks around to overlie the running surface 32 and the flange 33. A gage arm 42 is pivotally coupled to the hooked portion of shank 40 at the gage arm pivot point 44. Rotation of the gage arm 42 into contact with the running surface 32 and flange 33 measures the standardized parameters that define the running surface 32 and flange 33 of the rim 30. The present invention is designed to sense and record the same standardized parameters as would be measured by the A.A.R. wheel gage 38.

The standardized parameters are depicted in FIG. 2a with reference to the running surface 32 and flange 33 of the rim 30. The diameter 46 of the railway wheel 20 is determined at a tape line defined on the running surface 32. The diameter of the railway wheel 20 varies between 28 and 36 inches for railroad cars and 42 inches for locomotives. The depiction of FIG. 2a is with reference to an X-Y axis 47. The gage point 36 defines the origin (0,0) of the X-Y axis 47 and the point from which the defining parameters of the profile are measured.

The tape line point 48 is defined as the point on the running surface 32 that has a dimension equal to 2.875 inches in the X direction from the gage point 36. The tape line point 48 is used both to calculate the diameter of the railway wheel 20 and the rim thickness of the rim 30. The rim thickness is defined as the dimension in the Y direction between the gage point 36 and the tape line point 48.

The gage arm pivot point 50 is a point in space that is coincident with the location of the gage arm pivot point 44 of the AAR wheel gage 38 when the AAR wheel gage 38 is in position to measure the railway wheel 20, as depicted in FIG. 2b. The gage arm pivot point 50 is defined as a point that is 1.912 inches in the Y direction and 1.609 inches in the X direction from the tape line point 48. The gage arm 42 of the AAR wheel gage 38 swings in an arc having a radius of 1.5 inches about the gage arm pivot point 44. Accordingly, the intersection of such arc defined about the gage arm pivot point 50 with the running surface defines the flange thickness point 52. The flange thickness is defined as the dimension in the X direction between the gage point 36 and the flange thickness point 52.

The flange height is measured at the flange height point 54, which is greatest diameter of the flange 33 of the railway wheel 20. The flange height point 54 is defined as that point that has the greatest dimension in the Y direction from the gage point 36. The flange height is defined as the dimension in the Y direction between the tape line point 48 and the flange height point 54.

Figure 3:
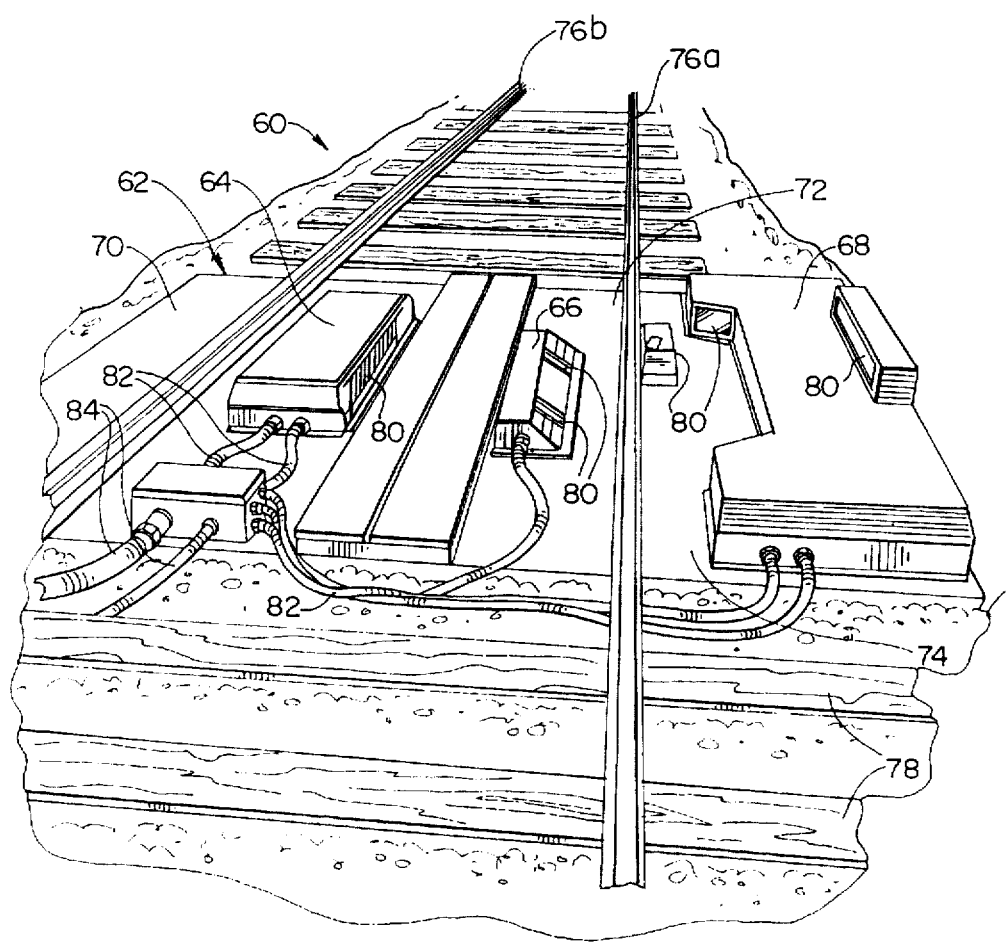
FIG. 3 is a perspective view of an inspection platform of the present invention disposed to capture the running surface profile of a railway wheel on the right rail.

The profile sensor of the present invention is shown generally at 60 in FIGS. 3-8. Referring to FIG. 3, the profile sensor 60 is disposed within an inspection platform 62. The profile sensor 60 is disposed within environmentally controlled enclosures 64, 66, 68. The enclosures 64, 66, 68 are secured to thick steel plates 70, 72, 74. The plates 70, 72, 74 are preferably mounted on vibration suppressing columns (not shown) that are independent of the rails 76 and the ties 78. The enclosures 64, 66, 68 include a plurality of windows 80 to which the various sensors, including lasers, cameras, and presence sensors, are able to view a railway wheel 20. The enclosures 64, 66, 68 are interconnected by a plurality of cables 82. Additionally, the cables 84 communicatively connect the inspection platform 62 to a controller (not shown) that is located near by, but away from the railroad bed. The controller is preferably located in a environmentally controlled bungalow. The inspection platform 62 depicted in FIG. 3 is disposed to record the profile of a railway wheel 20 that is moving on rail 76a. A similar inspection platform 62 is required to also record the profile of a railway wheel 20 that is moving on rail 76b.

The sensors of the profile sensor 60 are disposed in the protected environment behind windows 80 in the enclosures 64, 66, 68. The windows 80 are preferably shuttered to assist in keeping moisture and dust off the windows 80. An enclosure (not shown) located approximately 10 feet from the field side of one rail 76 contains an air compressor, regenerative air drying equipment, air storage tank, and enclosure heaters. The compressor maintains a specific pressure within the storage tank and the drying equipment removes moisture from the air as a train approaches the inspection platform 62. The dry air is directed against the windows 80 by nozzles (not shown). The high pressure air removes moisture and dust from the windows 80 and also keeps moisture and dust from settling on the windows 80 as a train passes through the inspection platform 62.

Figure 4:
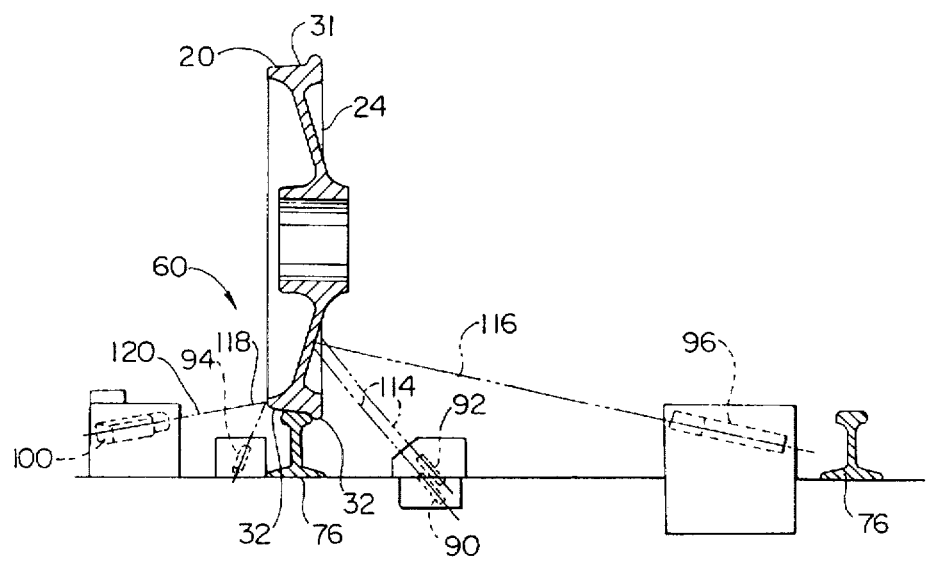
FIG. 4 is a view taken axially along the rail depicting the sectioned rails and a sectioned railway wheel with the apparatus of the present invention disposed to sense the profile of the running surface of the railway wheel.
Figure 5:
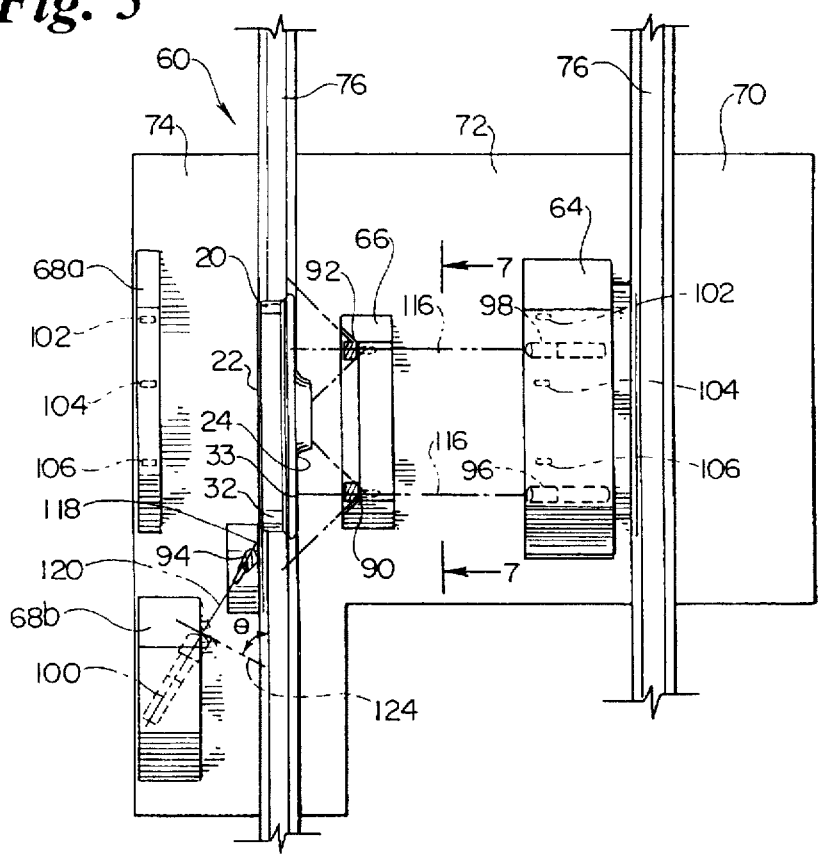
FIG. 5 is a top elevational view of the railway wheel, rails, and apparatus of the present invention as depicted in FIG. 4.

FIGS. 4–7 depict the geometrical arrangement of the sensors of the profile sensor 60. The sensors include laser 1, depicted at 90, laser 2, depicted at 92, and laser 3, depicted at 94. A camera is associated with each of the three lasers to sense the illumination provided by the associated laser. Camera 1, depicted at 96, is associated with laser 1. Camera 2, depicted at 98, is associated with laser 2. Camera 3, depicted at 100, is associated with laser 3. Additionally, three wheel presence sensors pairs 102, 104, 106 are depicted in FIG. 5.

Figure 7:
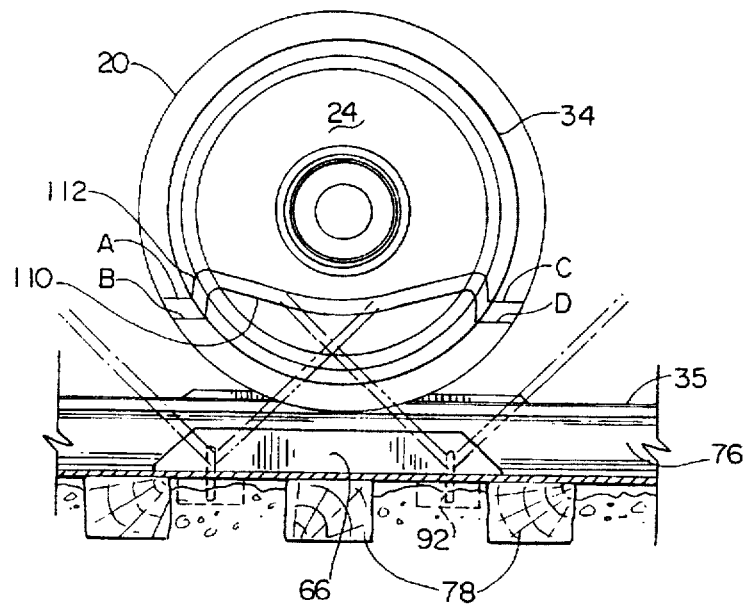
FIG. 7 is a gage side elevational view of the present invention as depicted in FIG. 4.

The enclosures 64 and 66 are designed to remain beneath a plane that is 2.7 inches above the head of the rails 76. Such positioning ensures clearance between the enclosures 64, 66 and the passing locomotives and rail cars. The rails 76 are approximately 7 inches high. Laser 1 is oriented to project a substantially horizontal line of light on the gage side of the railway wheel 20, intersecting the railway wheel 20 approximately 12 inches above ground level, as depicted in FIG. 7. Laser 2 is oriented to project a parallel line of light on the gage side of the railway wheel 20 at a point approximately 14 inches above the ground. Parallel lines of light projected on the gage side of the railway wheel 20 by the lasers 1 and 2 are depicted in FIG. 7 at 110, 112, respectively.

As depicted in FIG. 4, the angle between the light paths 114 projected from lasers 1 and 2 and the camera axis 116 is approximately 55 degrees. Preferably, the cameras 1 and 2 are placed 36 inches away from the gage side 24 of the railway wheel 20 that is to be sensed. The camera axes 116 of cameras 1 and 2 are oriented parallel to one another and spaced apart by a distance of preferably 22 inches. Data derived from cameras 1 and 2 are utilized to determine the center and gage points of the railway wheel 20 and the angle of attack of the railway wheel 20.

Laser 3 and camera 3 are placed on the field side 22 of the railway wheel 20 to capture the image of the sensed profile of the running surface 32 and flange 33 of the railway wheel 20. The light path 118 of laser 3 and the camera axis 120 of camera 3 are not orthogonal with the tape line of the railway wheel 20 or with the center axis of the rail 76. As depicted in FIG. 5, the light path 118 and the camera axis 120 lie in a common vertical plane that is displaced at an acute included angle with respect to a vertical plane passing through the tape line of the railway wheel 20. Laser 3 is preferably positioned approximately 6.5 inches from the center line of the rail 76. A number of factors affect the distance between the railway wheel 20 and camera 3 as will be explained, but, camera 3 will be approximately 32–36 inches from railway wheel 20 at the time that the sensed profile of the running surface 32 and flange 33 is recorded.

The first critical requirement of the profile sensor 60 is to accurately detect the presence of the railway wheel 20 at a specified location. Compounded with this constraint is the fact that the railway wheel 20 is in motion at varying speeds as the sensed profile of the running surface 32 and flange 33 is recorded. Accordingly, the presence sensors pairs 102, 104, 106 must have a very fast response time in order to minimize the time lapse between sensing the presence of a railway wheel 20 and the time that the sensed profile of the running surface 32 and flange 33 is recorded. The presence sensor pairs 102, 104, 106 may comprise photoelectric sensors, inductive proximity sensors, or capacitive proximity sensors. In the preferred embodiment, photoelectric sensors are utilized.

Each pair of presence sensors pairs 102, 104, 106 has a light source and a detector mechanism. In the depicted embodiment, the light source of the presence sensors pair 102–106 is located on one side of the railway wheel 20 and the detector mechanism of the presence sensors pair 102–106 is located on the other side of the railway wheel 20. The railway wheel 20 then intercepts the light beam to sense the presence of the railway wheel 20. Alternatively, the light source and the detector mechanism of the presence sensors pair 102–106 is disposed on the same side of the railway wheel 20 and the light from the light source is reflected off the metal surface of the railway wheel 20 back to the detector mechanism, thereby sensing presence of the railway wheel 20.

The speed of a railway wheel 20 is obtained by measuring the time that it takes for the railway wheel 20 to move from one point to another. Referring to FIG. 5, the distance between the presence sensors pairs 102, 104, 106 is known through calibration. Preferably, a digital input/output module with very high timing resolution is used to receive the signal from the presence sensors pairs 102, 104, 106. The input/output module determines the time between two signals received from the presence sensors pairs 102, 104, 106 and converts it to train speed by dividing the distance between two of the presence sensors pairs 102, 104, 106 by the elapsed time between the signals received from the two pairs of the presence sensors pair 102, 104, 106.

Once the presence of a railway wheel 20 has been sensed, the cameras 1, 2, and 3 are activated simultaneously to capture images used to calculate the desired parameters of the profile. Measurement of the center, diameter, and angle of attack of the railway wheel 20 requires sensing the images projected by laser 1 and laser 2 on the gage side 24 of the railway wheel 20 by camera 1 and camera 2, respectively. The lasers 1 and 2 project two substantially parallel lines light lines on the gage side 24 of the railway wheel 20, as depicted in FIG. 7. The two light lines 110, 112 are chords and each intersect the gage circumference 34 of the railway wheel 20. The two light lines 110, 112 define four gage points A, B, C, and D detectable by cameras 1 and 2. The four gage points A, B, C, and D are detected by image processing techniques. A circle that represents gage circumference 34 of the railway wheel 20 is determined using the four gage points A, B, C, and D with a least-square-error circle fitting algorithm. Alternatively, a linear minimization routine could be used to determine the gage circumference. The circle fitting algorithm is used to calculate a best-fit circle with minimum error. Once the circle that is equal to gage circumference 34 is calculated, the radius and center of the railway wheel 20 in wheel coordinates can be calculated and used to obtain profile measurements.

Once the gage circumference 34 is determined, the radius of the gage circumference is determined. The radius is equivalent to the distance between the gage point 36 and the center of the railway wheel 20. The radius is used to determine rim thickness. The rim thickness equals the radius of the railway wheel 20 taken at the tape line point 48 minus the radius of the railway wheel 20 taken at the gage point 36.

The angle of attack, alpha, is not zero if the gage points a and c and the gage points b and d are of difference heights. The angle of attack is then determined by the following equation:

$$\partial = \tan^{-1}[(Y \text{ difference gage point } A \text{ to } C)/(X \text{ difference gage point } A \text{ to } C)]$$

Figure 6:
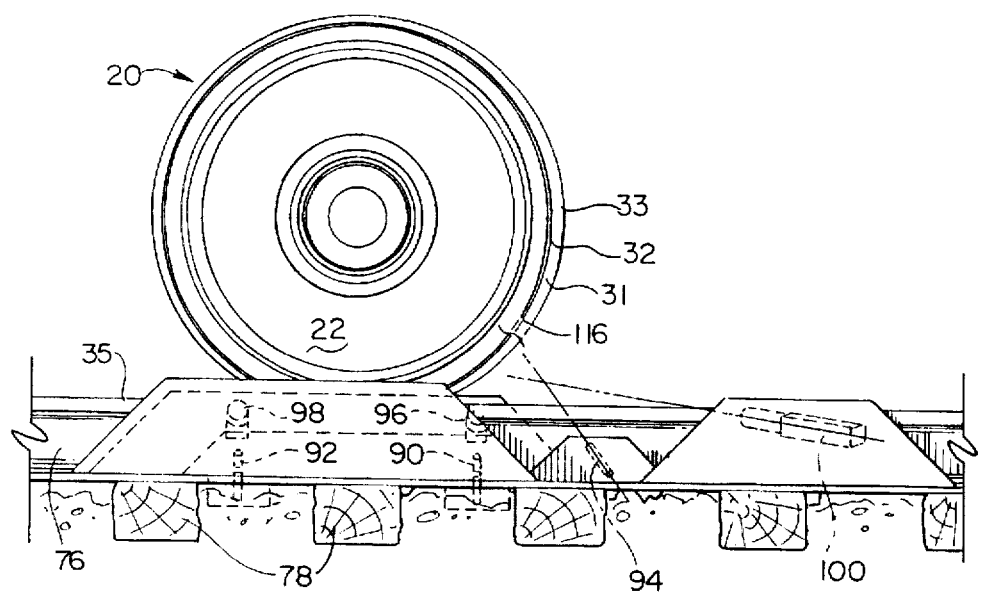
FIG. 6 is a field side elevational view of the apparatus of the present invention as depicted in FIG. 4.

Referring to FIG. 6, laser 3 shown at 94 projects a light image on the field side 22 of the railway wheel 20. Camera 3, depicted at 100, records the image of the light path 115 between the end points defined as the field side of the running surface 32 and the gage side of the flange 33. The light line on the railway wheel 20 provides information to the control system from which the tape line and the flange height is determined. Additionally, complete profile of the running surface 32 and flange 33 is recorded by the control system. The sensed profile is calculated in world coordinates first and then converted to wheel coordinates.

Preferably, the sensed profile is comprised of one hundred data points recorded by the control system. Point density is programmable as desired to achieve an accurate profile measurement. Most of the railway wheels 20 in use currently are six inches wide from the field side of the running surface 32 to the gage side of the flange 33. It is more important to capture the rapid position change of the data points that occurs proximate the flange 33 as compared to across the running surface 32 where position changes are minimal. Accordingly, the control system biases the data points recorded to record approximately half of the data points in the two inches of railway wheel 20 width proximate the flange 33 and the remaining half of the data points across the four inches comprising most of the running surface 32.

Figure 8:
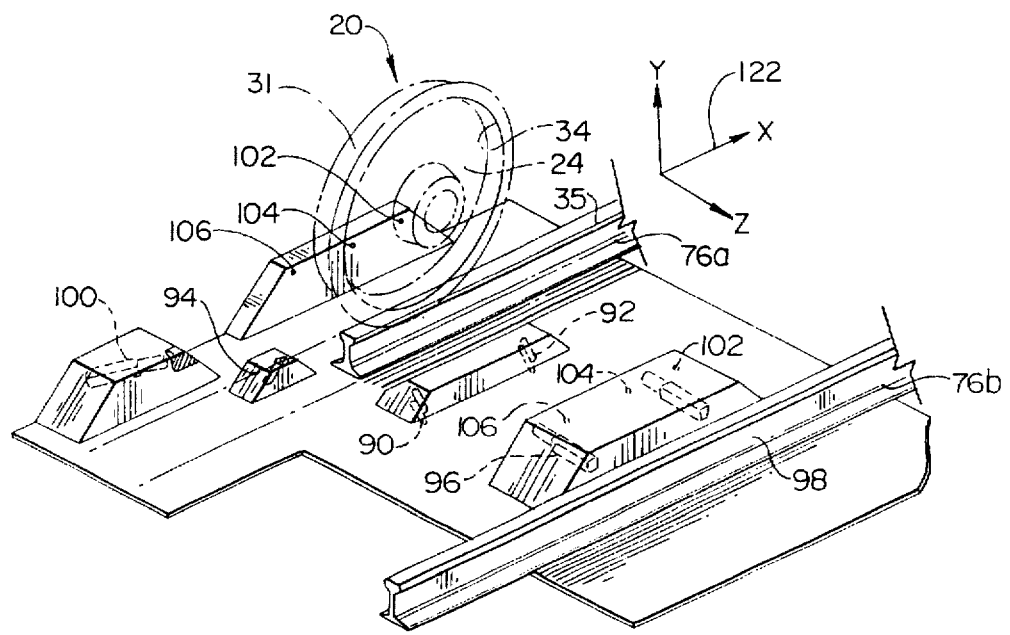
FIG. 8 is a perspective view of the present invention as depicted in FIG. 4 with a railway wheel presented in phantom.

A reference coordinate system is presented at 122 in FIG. 8. In profiling a rolling railway wheel 20, the position of the railway wheel 20 on the track 76 and the profiling location on the running surface 32 of the railway wheel 20 changes with varying train speed in the X direction, vertical movement of the railway wheel in the Y direction due to the time delay between sensing the presence of the railway wheel 20 and recording the profile thereof, varying railway wheel 20 diameter, and angle of attack of the railway wheel 20, seen as rotational displacement about the Y axis.

The actual profile measurement on the railway wheel 20 must be a profile measured in the direction of a radial line that intersects running surface 32 and flange 33 of the railway wheel and cuts through the center of the railway wheel 20. The profiles are taken off center and are corrected to a radial profile by knowing the wheel diameter and center. In order to obtain the actual profile measurement, movement of the railway wheel 20 in both the X and Y directions from a known reference point must be accounted for. The image plane 124 of camera 3 is defined as a plane oriented orthogonally with respect to the camera axis 120. By means of accurately calibrating the profile sensor 60, the view angle theta ($\emptyset$) defined as the included angle between the longitudinal axis of the rail 76 and the image plane 124 of camera 3 is accurately known. Measurement corrections are required as a result of motion of the wheel from the time that the profile sensor 60 is initialized as a result of sensing the presence of a railway wheel 20 by the presence sensors pairs 102, 104, 106 and the time that camera 3 actually records the image of the profile. In order to calculate the corrections a reference point in world coordinates is selected.

The depth, d, is defined as the distance between the image plane 124 of camera 3 and the point of the sensed image on the railway wheel 20, is calculated with reference to the image plane 124. Knowing the view angle theta, the depth, d, can be determined. The depth, d, can be converted to the depth in world coordinates by multiplying the depth, d, by sine theta and by cosine theta to obtain both X and Y coordinates. The actual profile measurement is the measured profile as sensed by camera 3 corrected for motion of the wheel and additional corrections, as will be discussed. All the sensed profiled points that are in world coordinates must be converted to wheel center coordinates in order to obtain actual profile measurements.

The first correction that must be made is a correction for horizontal shift, DX. Through the horizontal shift, DX, the sensed profile, p' is different from the actual profile, p, of the running surface 32 and flange 33 of the railway wheel 20. The sensed profile, p', can be determined according to the following equation:

$$p' = DX \cos \emptyset + [p^2 - (DX \sin \emptyset)^2]^{1/2}$$

The error between the sensed profile, p', and the actual profile, p, is referred as dp. The error dp can be determined according to the following equation:

$$dp = |p - p'| = |p - DX \cos \emptyset + [p^2 - (DX \sin \emptyset)^2]^{1/2}|$$

The second correction that must be applied is one that accounts for vertical movement, DY, that occurs in the railway wheel 20 after passing the reference point. Vertical movement of the railway wheel is the result of hop or bounce that may occur due to an irregular running surface 32 of the railway wheel 20. The sensed profile p' can be calculated according to the following equation:

$$p' = DY \cos \emptyset + [p^2 - (DY \sin \emptyset)^2]^{1/2}$$

and the error, dp, between the sensed profile p' and the actual profile p can be determined according to the following equation:

$$dp = |p - p'| = |p - DY \cos \emptyset + [p^2 - (DY \sin \emptyset)^2]^{1/2}|$$

The third correction that must be applied to the sensed measurement of the profile to obtain the actual measurement of the profile is one to account for the varying diameter of various railway wheels 20. The effect of varying the diameter is to cause both an error in the X direction and in the Y direction. The shift, DS, in the wheel center from the reference point is caused by the varying diameter of the railway wheel 20 and includes both a horizontal shift, DX, and a vertical shift, DY. The sensed profile, p', can be determined according to the following equation:

$$p' = DS \cos \emptyset' + [p^2 - (DS \sin \emptyset')^2]^{1/2}$$

where $$\emptyset^1 = 90° - \tan^{-1} \frac{DX}{DY} + \emptyset$$

The error between the sensed profile, p', and the actual profile, p, can be determined according to the following equation:

$$dp = |p - p'| = |p - DS \cos \emptyset' + [p^2 - (DS \sin \emptyset')^2]^{1/2}|$$

The final correction which must be applied to the sensed profile measurement is to account for the angle of attack of the railway wheel 20. An angle of attack, $\partial$, that is greater than or less than zero results in a translation of the center of the railway wheel 20 in the Z direction. Translation in the Z direction results in an error in the X direction. Accordingly, the error from the angle of attack, $\partial$, can be determined by the following equation:

$$DX = Zx \tan \partial$$

After making this final correction, accurate actual profile measurements of the running profile 32 and flange 33 are obtained.

In operation, a sensor (not shown) is positioned 800 to 900 feet down the track 76 on either side of the profile sensor 60. When one of these sensors sense the approach of a train, a signal is sent to the control system and the profile sensor 60 is placed in a condition of readiness to measure the profile of the running surface 32 and flange 33 of the first railway wheel 20. The control system of the profile sensor 60 opens the shutters on the windows 80 of the enclosures 64, 66, 68. Cleansing air from the air compressor is enabled and directed at the windows 80. All the lasers 1, 2, and 3 are turned on. It should be noted that the lasers 1, 2, and 3 are kept on continually until the train passes through the inspection platform 62. The control system additionally enables input from the cameras 1, 2, and 3. When a railway wheel 20 is sensed by the presence sensors pairs 102, 104, 106, the cameras 1, 2, and 3 are activated and images of the light lines 110, 112 and the light lines 115 of the profile of the running surface 32 and flange 33 of the railway wheel 20 are recorded. This sequence is performed for each wheel of the train that passes the profile sensor 60.

After the train has passed, the lasers 1, 2, and 3 are shut off and the shutters are closed. When the shutters have been closed, cleansing air from the air compressor is terminated.

In order to calculate the actual profile of the running surface 32 and the flange 33, the control system utilizes the following method:

1. Capture the aforementioned three images from cameras 1,2, and 3 simultaneously.
2. Determine the end points of the profile image detected by camera 3.
3. Determine the two gage points A and B as sensed by camera 1.
4. Determine the two gage points C and D as sensed by camera 2.
5. Calculate the wheel center, radius of the gage circumference, and wheel angle of attack in world coordinates.
6. Calculate the profile measurement as sensed by camera 3 in world coordinates.
7. Use the wheel center as the origin of the wheel coordinates and transform all measurements into wheel coordinates from world coordinates.
8. Calculate the actual profile data, wheel diameter, angle of attack, the flange height, flange thickness, and rim thickness in wheel coordinates.
9. Report and save the data.

The method in step 8 above for utilizing the one hundred data points comprising the sensed profile of the running surface 32 and flange 33 to determine the actual flange height, flange thickness, and rim thickness after applying the aforementioned corrections from world coordinates to wheel coordinates is as follows:

1. Search through the one hundred data points to determine the point that has an X dimension that is equal to 2.875 inches from the gage point 36. This is the tape line point 48 on the running surface 32.
2. Determine the gage arm pivot point 50 which is a point having a dimension of 1.609 inches in the minus X direction with respect to the tape line point 48 and a dimension of 1.912 inches in the Y direction with respect to the tape line point 48. The rim thickness is calculated as the dimension in the Y direction from the gage point 36 to the tape line point 48.
3. Calculate a circle centered on the gage arm pivot 50 having a radius of 1.5 inches. The intersection of this circle and the one hundred points comprising the sensed profile of the running surface 32 and flange 33 is the flange thickness point 52, the flange thickness being the dimension in the X direction from the gage point 36 to the flange thickness point 52.
4. Search through the one hundred data points comprising the sensed profile to determine that point that has the greatest Y dimension with respect to the gage point 36. That point is utilized to determine the flange height, the flange height being the dimension in the Y direction from the tape line point 48 to the flange height point 54.

An additional calculation is made using information recorded from cameras 1 and 2 shown at 96, 98. Knowing the diameter of the gage circumference 34, the diameter of the railway wheel 20 is calculated as the diameter of the gage circumference 34 plus 2 times the rim thickness. The diameter of the railway wheel 20 is therefore calculated at the tape line point 48.

Tests have been conducted to verify the measurement accuracy of the profile sensor 60 using the dynamic wheel set up in the applicant's laboratory. The wheel speed was approximately 6–8 miles per hour for the dynamic tests. The wheel used for the test is a condemnable wheel with a 1.5 inch flange height. The flange thickness ranges from 0.806 inch to 0.910 inch. The flange height and flange thickness information was obtained by taking manual measurements every 30 degrees around the wheel using the A.A.R. steel wheel gage as depicted in FIG. 2b. The manual measurements are tabulated in Table 1. Table 1 is presented as a basis against which to compare the results obtained using the wheel profile sensor of the present invention sensing the same railway wheel in both static and dynamic tests. In table the position on the circumference of the railway wheel is indicated adjacent to the left margin. Measurements were taken in a counterclockwise direction, with position 1 being 12:00 o'clock on the circumference, position 2 being 9:00 o'clock on the circumference, position 3 being 6:00 o'clock on the circumference, and position 4 being 3:00 o'clock on the circumference.

TABLE 1

Reference Wheel Measurements
(Using the A.A.R. Steel Wheel Gage)

|   | Flange Thickness | Flange Height | Rim Thickness |
|---|---|---|---|
| 1 | 1.060 | 1.50 | 0.81250 |
|   | 1.060 | 1.50 | 0.81250 |
|   | 1.060 | 1.50 | 0.81250 |
|   | 1.070 | 1.50 | 0.81250 |
| 2 | 1.080 | 1.50 | 0.81250 |
|   | 1.080 | 1.50 | 0.84375 |
|   | 1.085 | 1.50 | 0.87500 |
|   | 1.085 | 1.50 | 0.90625 |
| 3 | 1.090 | 1.50 | 0.90625 |
|   | 1.090 | 1.50 | 0.90625 |
|   | 1.090 | 1.50 | 0.90625 |
|   | 1.080 | 1.50 | 0.87500 |
| 4 | 1.070 | 1.50 | 0.84375 |
|   | 1.070 | 1.50 | 0.84375 |
|   | 1.060 | 1.50 | 0.84375 |
|   | 1.060 | 1.50 | 0.81250 |
| Minimum | 1.060 | 1.500 | 0.813 |
| Maximum | 1.090 | 1.500 | 0.906 |
| Average | 1.074 | 1.500 | 0.852 |
| Range | 0.030 | 0.000 | 0.094 |

The first test using wheel profile sensor of the present invention was performed to verify the system repeatability on a moving wheel. The maximum shift in the position of the railway wheel caused by the speed and the angle of attack of the wheel between the time that the presence of the wheel is detected and the three images are captured is calculated to be approximately four inches. The railway wheel profile was measured over the four inch distance of the calculated shift at 0.5 inch intervals. The measurements produced an accuracy within ±0.02 inch, demonstrating that the profile sensor 60 accurately accounts for varying depths, d, caused by the speed and the angle of attack of the wheel. The second test was performed to verify the repeatability of the profile sensor 60 on a moving wheel at very low speeds. Twenty-six measurements were taken by pushing the wheel passed the profile sensor 60. The point on the rim of the wheel at which the measurements were taken was substantially the same for all the twenty-six measurements. The system repeatability for a moving wheel is within the desired 0.01 inch. The test results are listed in Table 2.

TABLE 2

Static Profile Measurements at Different Locations Along the Circumference (Moving by Hand)

| Static Wheel Test | Flange Thickness | Flange Height | Rim Thickness | Diameter | Angle of Attack |
|---|---|---|---|---|---|
| 1 | 1.12 | 1.43 | 0.88 | 32.11 | −0.15 |
| 2 | 1.10 | 1.43 | 0.88 | 32.08 | −0.15 |
| 3 | 1.15 | 1.43 | 0.88 | 32.09 | −0.15 |
| 4 | 1.13 | 1.43 | 0.89 | 31.99 | −0.16 |
| 5 | 1.12 | 1.43 | 0.89 | 32.04 | −0.14 |
| 6 | 1.14 | 1.44 | 0.88 | 32.01 | −0.16 |
| 7 | 1.12 | 1.43 | 0.88 | 32.05 | −0.13 |
| 8 | 1.11 | 1.43 | 0.89 | 32.06 | −0.15 |
| 9 | 1.13 | 1.43 | 0.88 | 31.97 | −0.15 |
| 10 | 1.12 | 1.43 | 0.88 | 32.02 | −0.14 |
| 11 | 1.13 | 1.43 | 0.88 | 31.99 | −0.14 |
| 12 | 1.12 | 1.43 | 0.88 | 32.06 | −0.14 |
| 13 | 1.12 | 1.43 | 0.87 | 32.15 | −0.13 |
| 14 | 1.12 | 1.43 | 0.87 | 32.04 | −0.14 |
| 15 | 1.15 | 1.44 | 0.88 | 31.98 | −0.13 |
| 16 | 1.13 | 1.43 | 0.88 | 32.04 | −0.14 |
| 17 | 1.10 | 1.43 | 0.89 | 32.05 | −0.14 |
| 18 | 1.15 | 1.43 | 0.89 | 32.03 | −0.13 |
| 19 | 1.11 | 1.43 | 0.88 | 31.98 | −0.14 |
| 20 | 1.11 | 1.43 | 0.88 | 31.97 | −0.14 |
| 21 | 1.12 | 1.43 | 0.89 | 32.01 | −0.13 |
| 22 | 1.13 | 1.44 | 0.89 | 32.00 | −0.13 |
| 23 | 1.10 | 1.43 | 0.89 | 31.90 | −0.13 |
| 24 | 1.13 | 1.44 | 0.88 | 32.12 | −0.13 |
| 25 | 1.13 | 1.44 | 0.88 | 32.06 | −0.12 |
| 26 | 1.12 | 1.43 | 0.88 | 32.08 | −0.12 |
| Min. | 1.10 | 1.43 | 0.87 | 31.90 | −0.16 |
| Max. | 1.15 | 1.44 | 0.89 | 32.15 | −0.12 |
| Average | 1.12 | 1.43 | 0.88 | 32.03 | −0.14 |
| Range | 0.05 | 0.01 | 0.02 | 0.25 | 0.04 |

The third test was performed to verify the dynamic wheel image capturing and measurement accuracy at higher speeds. A measurement run was performed at the highest possible speed in the lab which is 6–8 miles per hour. The results from this test are listed in Table 3.

TABLE 3

Dynamic Wheel Test Results 6–8 MPH

| Dynamic Wheel Test | Flange Thickness | Flange Height | Rim Thickness | Diameter | Angle of Attack |
|---|---|---|---|---|---|
| 1 | 1.10 | 1.45 | 0.82 | 31.86 | −0.43 |
| 2 | 1.12 | 1.45 | 0.92 | 31.89 | −0.85 |
| 3 | 1.12 | 1.45 | 0.85 | 31.79 | −0.47 |
| 4 | 1.11 | 1.45 | 0.83 | 31.66 | −0.45 |
| 5 | 1.12 | 1.46 | 0.84 | 31.72 | −0.42 |
| 6 | 1.10 | 1.44 | 0.87 | 32.08 | −0.81 |
| 7 | 1.11 | 1.45 | 0.83 | 31.75 | −0.42 |
| 8 | 1.12 | 1.45 | 0.84 | 31.82 | −0.44 |
| 9 | 1.11 | 1.45 | 0.87 | 31.97 | −0.68 |
| 10 | 1.13 | 1.45 | 0.91 | 31.90 | −0.86 |
| 11 | 1.12 | 1.45 | 0.88 | 32.02 | −0.92 |
| 12 | 1.12 | 1.46 | 0.83 | 31.85 | −0.45 |
| 13 | 1.13 | 1.45 | 0.88 | 31.94 | −0.72 |
| Minimum | 1.10 | 1.44 | 0.82 | 31.66 | −0.92 |
| Maximum | 1.13 | 1.46 | 0.92 | 32.08 | −0.42 |
| Average | 1.12 | 1.45 | 0.86 | 31.87 | −0.61 |
| Range | 0.03 | 0.02 | 0.10 | 0.42 | 0.50 |

Figure 9:
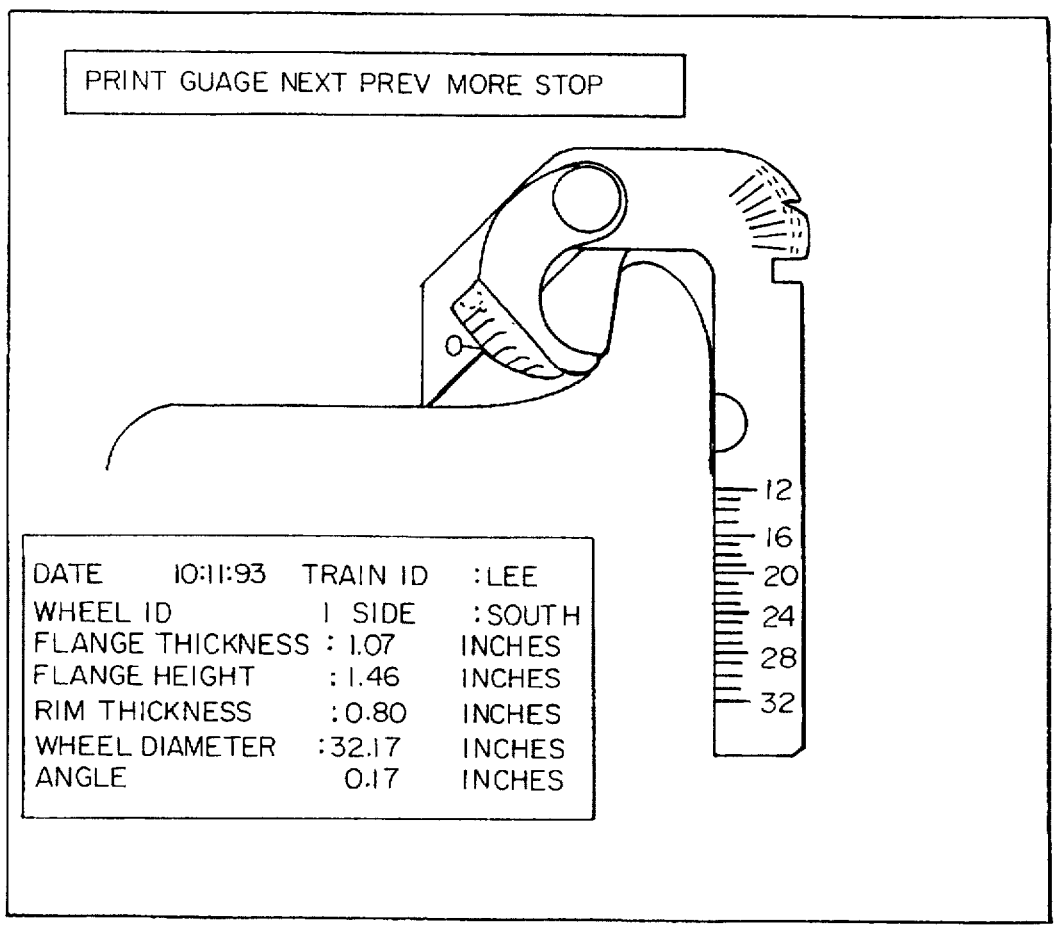
FIG. 9 is a representation of a railway wheel profile measurement made by the present invention and displayed on a video monitor.

The accuracy of the profile sensor has been shown to be better than ±0.05 inches. The variation in rim thickness measurement reflects the variation on the condemnable wheel itself. As depicted in FIG. 9, the results of the profile measurement can be displayed on a video monitor showing the full profile of the running surface 32 and flange 33 with the depiction of an A.A.R. wheel gage 38 imposed thereon. Additionally in the screen representation is a field indicating the date, the train identification, the wheel identification, the flange thickness in inches, the flange height in inches, the rim thickness in inches, the wheel diameter in inches, and the angle of attack.

Although we have herein shown and described but one specific arrangement of the apparatus for measuring the profile of railway wheels while such wheels are in motion, it is to be understood that various modifications and changes may be made therein within the scope of the appended claims without departing from the spirit and scope of the invention.

What is claimed is:

1. Measurement apparatus for measuring the profile of a railway wheel while said railway wheel is in rolling motion on a rail, said railway wheel having a gage side and a field side, a gage circumference being defined on the gage side thereof, and said railway wheel having a circumferentially defined running surface and flange, comprising:

first sensor means having an emitter and an associated receiver being disposed on the field side of the railway wheel and being disposed at an included angle with respect to the rail that is less than orthogonal for sensing the profile of the running surface and flange of the railway wheel at a point on circumference thereof;

second sensor means having at least one emitter and at least an associated receiver being disposed on the gage side of the railway wheel for sensing a plurality of gage points on the gage circumference of the railway wheel; and a control means operably communicatively coupled to the first and second means for activating the first sensor means responsive to the detection of the presence of a railway wheel and for applying the plurality of gage points on the gage circumference of the railway wheel sensed by the second sensor means to the wheel profile sensed by the first sensor means to generate an actual profile measurement of the railway wheel running surface and flange taken along a plane defined by a radial section of the railway wheel.

2. A measurement apparatus as claimed in claim 1 wherein the control means utilizes the sensed plurality of gage points to determine the center, diameter and angle of attack of the railway wheel.

3. A measurement apparatus as claimed in claim 1 wherein the second sensor means senses the end points of two chords of the gage circumference of the railway wheel.

4. A measurement apparatus as claimed in claim 3 wherein the two chords of the gage circumference of the railway wheel are substantially parallel with respect to one another.

5. A measurement apparatus as claimed in claim 4 wherein the control means determines a railway wheel angle of attack as a function of differences in height of the two end points of at least one of the chords of the gage circumference of the railway wheel with respect to a selected reference height.

6. A measurement apparatus as claimed in claim 1 wherein the profile is comprised of a plurality of spaced apart sensed points extending from the field side of the running surface to the gage side of the flange, the sensed points being more closely spaced proximate the flange as compared to the points that are proximate the rim of the railway wheel.

7. A measurement apparatus as claimed in claim 6 wherein the profile of the wheel is determined in world coordinates and corrected to wheel coordinates by the control means utilizing corrections derived from a plurality of gage points sensed by the second sensor means on the gage circumference of the railway wheel.

8. A measurement apparatus as claimed in claim 7 wherein the control means selects a tape line point, a flange height point and a flange thickness point from the plurality of points sensed by the first sensor means to define parameters of a rim thickness, a flange height and a flange thickness of the railway wheel, said parameters being representative of the railway wheel profile.

9. A measurement apparatus as claimed in claim 1 wherein the sensed profile of the railway wheel is corrected for motion for the railway wheel occurring in the period of time between sensing the presence of the railway wheel and the second sensor means sensing the railway wheel profile, the corrections for motion being a component of the actual profile measurement of the railway wheel.

10. A measurement apparatus as claimed in claim 1 wherein the sensed profile of the railway wheel is corrected for the diameter of the railway wheel.

11. A measurement apparatus as claimed in claim 1 wherein the first sensor means emitter is a light source and the receiver a light receiver.

12. A measurement apparatus as claimed in claim 11 wherein the first sensor means light source is a laser and the first sensor means light receiver is a camera.

13. A measurement apparatus as claimed in claim 11 wherein the light source projects light along a light path emanating from the light source and the light receiver detects light images along a light receiver axis, the light source light path and the light receiver axis lying in a common substantially vertical plane.

14. A measurement apparatus as claimed in claim 13 wherein the plane in which the light source light path and the light receiver axis lie is disposed at an acute included angle with respect to a substantially vertical plane that passes through the centerline of the rail.

15. A measurement apparatus as claimed in claim 14 wherein the included acute angle defined between the plane in which the light source light path and the light receiver axis lie and the substantially vertical plane that passes through the centerline of the rail is fifty-five degrees or less.

16. A measurement apparatus as claimed in claim 1 wherein the second sensor means emitter comprises a first light source and a second light source and the second sensor means receiver comprises a first light receiver and a second light receiver, the first light receiver being associated with the first light source and the second light receiver being associated with the second light source.

17. A measurement apparatus as claimed in claim 16 wherein the two sensor means light sources are lasers and the two sensor means light receivers are cameras.

18. A measurement apparatus as claimed in claim 16 wherein each of the two light sources projects light along a light path emanating from the respective light source and the associated light receiver detects light images along a light receiver axis, each light source light path and the associated light receiver axis lying in a common substantially vertical plane.

19. A measurement apparatus as claimed in claim 18 wherein the plane in which the first light source light path and the associated light receiver axis lie is spaced apart from and substantially parallel to the plane in which the second light source light path and the associated light receiver axis lie.

20. A measurement apparatus as claimed in claim 19 wherein the plane in which the first light source light path and the associated light receiver axis lie and the plane in which the second light source light path and the associated light receiver axis lie are disposed in a substantially orthogonal relationship with respect to a substantially vertical plane that passes through the centerline of the rail.

21. Measurement apparatus for measuring the profile of a railway wheel while said railway wheel is in rolling motion on a rail, said railway wheel having a gage side and a field side and a circumferentially defined running surface and flange, comprising:

first sensor means having an emitter and an associated receiver being disposed on the field side of the railway wheel and being disposed at an included angle with respect to the rail that is less than orthogonal for sensing the profile of the running surface and flange of the railway wheel at a point on circumference thereof;

second sensor means having at least one emitter and at least an associated receiver being disposed on the gage side of the railway wheel for sensing selected wheel parameters; and a control means operably communicatively coupled to the first and second means for activating the first sensor means responsive to the detection of the presence of a railway wheel and for applying the selected railway wheel parameters sensed by the second sensor means to the wheel profile sensed by the first sensor means to generate an actual profile measurement of the railway wheel running surface and flange taken along a plane defined by a radial section of the railway wheel, wherein the sensed profile of the railway wheel is corrected for angle attack of the railway wheel existing at the time that the second sensor means senses the railway wheel profile, the correction for angle of attack being a component of the actual profile measurement of the railway wheel.

22. A method for measuring the profile of a railway wheel while said railway wheel is in rolling motion on a rail, said railway wheel having a gage side and a field side, a gage circumference being defined on the gage side thereof and having a rim having a circumferentially defined running surface and flange, comprising the steps of:

a. capturing the images including a first two gage points, a second two gage points, and the sensed profile of the running surface and flange substantially simultaneously;

b. determining the coordinates of end points of the sensed profile image;

c. determining the coordinates of the first two gage points;

d. determining the coordinates of the second two gage points;

e. calculating the wheel center, radius of the gage circumference, and wheel angle of attack in world coordinates using the coordinates of the first and second two gage points;

f. calculating the profile measurement comprised of a plurality of data points in world coordinates using the sensed profile image;

h. transforming all calculations into wheel coordinates from world coordinates using the wheel center as the origin of the wheel coordinates;

i. calculating the actual wheel profile comprising a plurality of data points, the wheel diameter, the angle of attack, the flange height, the flange thickness, and the rim thickness in wheel coordinates; and j. reporting and saving the calculated data.

23. A method for measuring the profile of a railway wheel as claimed in claim 22 the wheel coordinates calculated in step i having substantially orthogonally disposed X and Y axes, step i of the method further including the steps of:

a. calculating a tapeline point on the running surface of the wheel by searching through the plurality of data points comprising the profile of the running surface and flange to determine the point that has an X dimension that is equal to 2.875 inches from a point on the gage circumference;

b. calculating the gage arm pivot point, said gage arm pivot point having a dimension of 1.609 inches in the minus X direction with respect to the tape line point and a dimension of 1.912 inches in the Y direction with respect to the tape line point;

c. calculating a circle centered on the gage arm pivot having a radius of 1.5 inches;

d. calculating the flange thickness by determining the flange thickness point, the flange thickness point being the point of intersection of said circle and the plurality of data points comprising the profile of the running surface and flange is the flange thickness point, the flange thickness being the dimension in the X direction from a point on the gage circumference to the flange thickness point; and e. calculating the flange height by searching through the plurality of data points comprising the profile of the running surface and flange to determine that point that has the greatest Y dimension with respect to a point on the gage circumference, said point being the flange height point, the flange height being the dimension in the Y direction from the tape line point to the flange height point.

24. A method for measuring the profile of a railway wheel as claimed in claim 23, further including the step of:

a. calculating the railway wheel diameter at the tape line point, the diameter being equal to twice the radius of the gage circumference plus twice the rim thickness.

25. A method for measuring the profile of a railway wheel as claimed in claim 24, further including the step of:

a. calculating the speed of the railway wheel by dividing the distance between a first wheel presence sensor and a second wheel presence sensor by the time difference between detection of the railway wheel by first wheel presence sensor and by the second wheel presence sensor.

26. Measurement apparatus for measuring the profile of a railway wheel while said railway wheel is in rolling motion on a rail, said railway wheel having a gage side and a field side, a gage circumference being defined on the gage side thereof, and said railway wheel having a circumferentially defined running surface and flange, comprising:

first sensor means having an emitter and an associated receiver being disposed on the field side of the railway wheel and being disposed at an included angle with respect to the rail that is less than orthogonal for sensing the profile of the running surface and flange of the railway wheel at a point on circumference thereof;

second sensor means having at least one emitter and at least an associated receiver being disposed on the gage side of the railway wheel for sensing a plurality of gage points on the gage circumference of the railway wheel, said gage points being the end points of two chords of the gage circumference of the railway wheel, the two chords of the gage circumference of the railway wheel being substantially parallel with respect to one another; and a control means operably communicatively coupled to the first and second means for activating the first sensor means responsive to the detection of the presence of a railway wheel and for applying the plurality of gage points on the gage circumference of the railway wheel sensed by the second sensor means to the wheel profile sensed by the first sensor means to generate an actual profile measurement of the railway wheel running surface and flange taken along a plane defined by a radial section of the railway wheel, wherein the control means determines a railway wheel angle of attack as a function of differences in height of the two end points of at least one of the chords of the gage circumference of the railway wheel with respect to a selected reference height.

* * * * *

UNITED STATES PATENT AND TRADEMARK OFFICE
CERTIFICATE OF CORRECTION

PATENT NO. : 5,793,492
DATED : August 11, 1998
INVENTOR(S) : Vanaki

It is certified that error appears in the above-identified patent and that said Letters Patent is hereby corrected as shown below:

In the Abstract, line 9, delete "senses" and insert --for sensing--.

Column 4, line 34, after "is" insert --the--.

Column 4, line 54, delete "a" and insert --an--.

Column 5, line 17, delete "sensors" and insert --sensor--.

Column 6, line 40, delete "lines".

Column 8, line 43, after "1/2" delete -- l --.

Column 9, line 28, insert a space between "1," and "2".

Column 9, line 28, insert a space between "2," and "and".
Column 10, line 32, delete "table" and insert --Table 1--.

Signed and Sealed this

Second Day of March, 1999

Attest:

Q. TODD DICKINSON

*Attesting Officer*     Acting Commissioner of Patents and Trademarks